United States Patent [19]

Sury

[11] Patent Number: 4,946,597

[45] Date of Patent: Aug. 7, 1990

[54] LOW TEMPERATURE BITUMEN RECOVERY PROCESS

[75] Inventor: Kohur N. Sury, Calgary, Canada

[73] Assignee: Esso Resources Canada Limited, Calgary, Canada

[21] Appl. No.: 328,420

[22] Filed: Mar. 24, 1989

[51] Int. Cl.[5] .................................... C02F 1/40

[52] U.S. Cl. .................................... 210/705; 208/390; 208/332; 209/167

[58] Field of Search .................... 209/5, 10, 166, 3, 9, 209/167; 208/390, 308, 311, 322, 332, 333; 210/702, 703, 704, 705, 729, 738, 638

[56] References Cited

U.S. PATENT DOCUMENTS 4,425,227 1/1984 Smith .................................... 209/5

*Primary Examiner*—Frank Sever

*Attorney, Agent, or Firm*—Arne I. Fors

[57] ABSTRACT

A low temperature process for separating bitumen from tarsands comprises slurrying tarsands in water at a temperature in the range of above about freezing to 35° C., preferably in the range of 2° to 15° C., mixing said aqueous slurry with a conditioning agent for a time sufficient to release bitumen from tarsands and to uniformly disperse the conditioning agent on the bitumen, and subjecting the resulting slurry to froth flotation for recovery of a bitumen product and production of sand tails. The process can be integrated with dredge or dry mining of the tarsands wherein the tarsands are normally sheared by a rotary cutter or bucket wheel and slurried with water by a slurry pump under attrition mixing conditions, with waterjet mining of tarsands in open pits wherein the resulting slurry can be collected by mechanical equipment, slurry pumps or the like gathering equipment, the resulting slurry fed to a pipeline and the conditioning agent added to the slurry pipeline for mixing with the slurry, or with borehole mining of tarsands wherein high pressure jets of water or water with conditioning agent disintegrates the tarsands in situ for initial slurrying of the tarsands. The conditioning agent preferably is a flotation agent having the characteristics of kerosene, diesel or kerosene/diesel together with a frother having the characteristics of methyl-isobutyl-carbinol and can be mixed with the aqueous slurry by attrition scrubbing or by flotation cell mixing. The slurry may contain up to 70% by weight tarsands and normally is adjusted by dilution to 15 to 30% by weight tarsands in water prior to froth flotation in one or two stages.

29 Claims, 7 Drawing Sheets

LOW TEMPERATURE BITUMEN SEPARATION FLOWSHEET

FIG.1. LOW TEMPERATURE BITUMEN SEPARATION FLOWSHEET

EFFECT OF ATTRITION-SCRUBBING MIXING SPEED ON BITUMEN RECOVERY

EFFECT OF ATTRITION-SCRUBBING MIXING SPEED ON BITUMEN CONTENT OF FROTH PRODUCT

EFFECT OF ATTRITION-SCRUBBING MIXING SPEED ON BITUMEN RECOVERY

EFFECT OF ATTRITION-SCRUBBING MIXING SPEED ON BITUMEN CONTENT OF FROTH PRODUCT

LOW TEMPERATURE BITUMEN RECOVERY PROCESS

BACKGROUND OF THE INVENTION

This invention relates to the separation of bitumen from tarsands and, more particularly, relates to the separation and recovery of bitumen from tarsands such as occur, for example, in the Athabasca tarsands in Alberta, Canada, by flotation at ambient temperatures.

Flotation processes for the beneficiation of bitumen from tarsands at temperatures of about 85° C, known as hot water flotation processes and typified by the Clark hot water process, are well known. However, such processes require the input of considerable thermal energy, much of which is not recoverable and is lost in the discharge of tailings which constitute in excess of 80% of the materials handled in the form of water and spent sands. Conventional hot water process plants must also normally be located in proximity to a supply of heat, thus necessitating costly transportation of the tarsands to central processing units close to thermal plants such as oil refineries.

The separation of bitumen from tarsands at substantially ambient temperatures would obviate the need for the separation plant to be close to a supply of heat and would permit separation of bitumen from the sands in proximity to the mining operation, thus minimizing the cost of transporting the solids which comprise by far the bulk of the materials handled, while facilitating the return of separated sand and fine solids to disposal areas.

Conventional dry mining of tarsands is accomplished by means of power shovels, draglines, bucketwheels and the like large earth moving equipment. Wet mining can be accomplished in open pits by means of rotary excavators in combination with slurry pumps operating from a dredge or by waterjets in combination with mechanical equipment, and for deep deposits, by means of high pressure water jets in combination with slurry pumps in boreholes. A flotation process which operates at ambient temperatures would provide the important advantage of permitting the choice of conventional dry mining techniques or wet mining techniques, the dry mining techniques employing hydraulic pipeline transportation of the mined tarsands to a separation plant and the wet mining techniques employing dredge mining, waterjetting or borehole mining with the option of hydraulic pipeline transportation of the tarsands to a separation plant or the processing of the tarsands on a dredge or adjacent a plurality of boreholes in an integrated mining and beneficiation operation with return of tailings directly to a tailings pond.

Dredge mining, waterjet mining in open pits or borehole mining of tarsands integrated with an ambient or low temperature flotation process would provide the important advantage of utilizing the shear energy consumed during the mining operation in water for initial disintegration of the tarsands and fragmentation of the bitumen for release from the sands preliminary to flotation.

Canadian Pat. No. 741,301 discloses the use of mechanical agitation and high energy water jets to form a slurry for flotation of bitumen in a hot water process. Canadian Pat. No. 915,608 discloses the use of shearing energy applied to an aqueous bituminous emulsion to coalesce and remove water therefrom at medium temperatures. The separation and recovery of bitumen from tarsands at ambient temperatures, i.e. "low temperatures" below about 35° C., has heretofore not been considered feasible or commercially viable.

SUMMARY OF THE INVENTION

It has been found that bitumen in tarsands can be beneficiated by froth flotation at low ambient temperatures in the range of from above freezing to about 35° C., preferably in the range of 2°–15° C., by slurrying the tarsands in water at a low temperature to particulate the bitumen and to release the bitumen particles from the sands and fine solids. It has been found that the amount of mechanical shear, i.e. mechanical shear energy input for a period of time necessary to particulate and liberate the bitumen during slurrying of the tarsands in water, particularly in the temperature range of 2°–15° C., must be increased at the low end of the temperature range and may be reduced at the upper end of the said temperature range. Thus mechanical shear and slurry temperature are interdependent and for an optimum recovery one may be exchanged for the other provided a minimum of each energy is maintained. The addition of conditioning chemicals, namely a flotation agent or collector to impart hydrophobicity to bitumen particles and a frothing agent to stabilize a bitumen froth product, surprisingly enhances froth flotation recovery of the bitumen at low temperatures. Settling of fine particles in the tailings discharge is substantially enhanced as compared to conventional hot water processes to significantly facilitate tailings disposal. The resulting bitumen flotation product can represent a recovery of up to 96% of the bitumen in the feed. The composition of the product, by weight, is as follows: 60 to 70% bitumen, about 20% solids, and the remainder water.

In its broad aspect, the process of the invention for separating bitumen from tarsands comprises the steps of slurrying from about 5 to 70% by weight tarsands in water at a temperature in the range of above about freezing to 35° C., preferably in the range of 2° to 15° C., and mixing said aqueous slurry in the presence of a conditioning agent to enhance flotation of the bitumen, subjecting said slurry to which the conditioning agent has been added to mixing for a time sufficient to release bitumen from tarsands and to uniformly disperse the conditioning agent on the bitumen, and subjecting the resulting slurry to froth flotation for recovery of a bitumen product and production of sand tails.

The conditioning agent may be added during slurrying of the tarsands in water or after slurrying of the tarsands in water before or during mixing of the slurry. In dredge mining of the tarsands, the tarsands are normally sheared by a rotary cutter or bucket wheel and slurried with water by a slurry pump under attrition mixing conditions. In waterjet mining of tarsands in open pits, the resulting slurry can be collected by mechanical equipment, slurry pumps or the like gathering equipment and fed to a slurry pipeline. The conditioning agent may be added to the slurry pipeline for subsequent mixing with the slurry. In borehole mining, high pressure jets of water or water with conditioning agent distintegrates the tarsands in situ for initial slurrying of the tarsands.

The conditioning agent preferably is a flotation agent having the characteristics of kerosene, diesel or kerosene/diesel together with a frother having the characteristics of methyl-isobutyl-carbinol (MIBC) added in an amount in the range of 100 to 800 ppm flotation agent and 50 to 400 ppm frother.

The slurry with added conditioning agent is subjected as necessary to mixing such as by attrition scrubbing or flotation cell mixing by an impeller at a speed in the range of 1500 to 3200 rpm, preferably in a preliminary step to the flotation step.

The slurry may contain up to 70% by weight tarsands and normally is adjusted by dilution to 15 to 30% by weight tarsands in water prior to froth flotation. Flotation can take place in a single stage or in two or more stages. Effective slurrying and mixing of the tarsands at low temperatures fragments and liberates the bitumen from the inorganic solids to allow facile separation of the bitumen from the sand and the fines components of the tarsands.

In addition to the presence of a collector and a frothing agent, the presence of sodium chloride in an amount in the range of 1.5 to 4 kilograms per ton of tarsands feed or sodium tri-poly phosphate (TSPP) in an amount in the range of about 1 to 2 kilograms per ton of tarsands feed has been found to enhance bitumen recovery.

BRIEF DESCRIPTION OF THE DRAWINGS

The process of the invention will now be described with reference to the accompanying drawings, in which.

DESCRIPTION OF THE PREFERRED EMBODIMENTS

Figure 1:
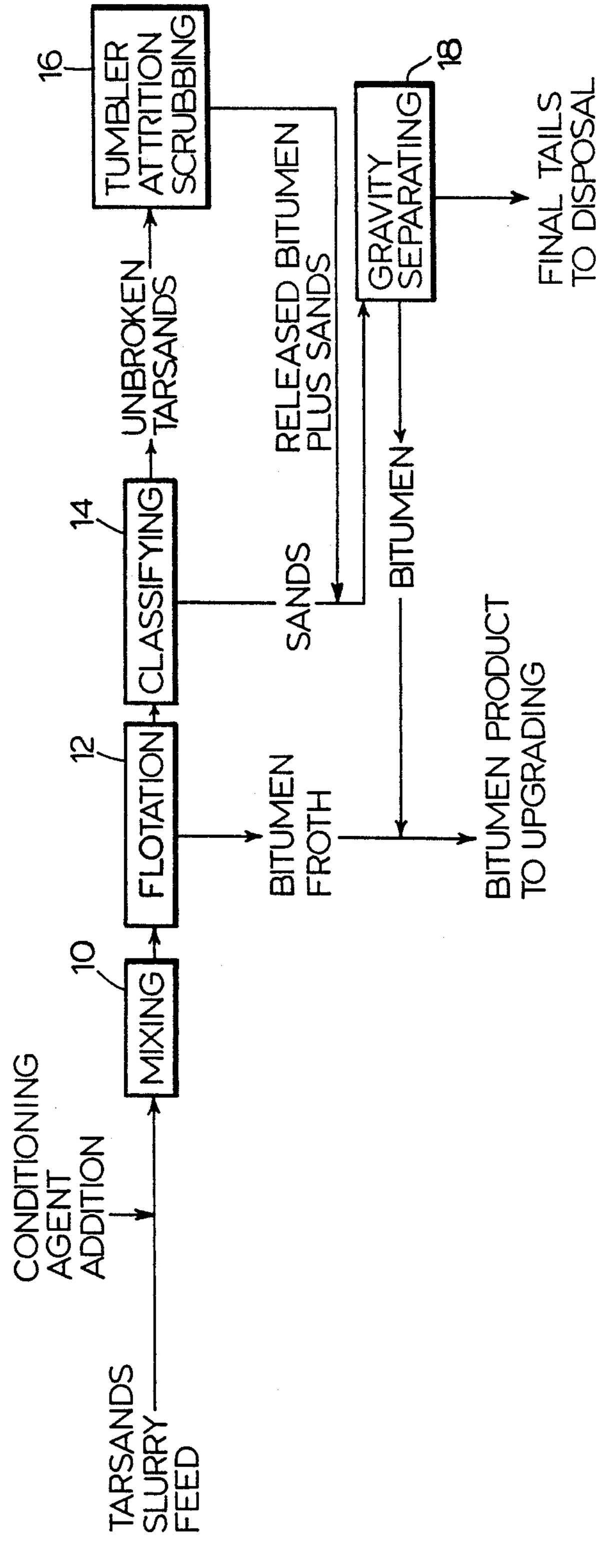
FIG. 1 is a schematic flow sheet of a low temperature bitumen recovery process for integration with hydraulic dredge mining, waterjet open pit mining, borehole mining or dry mining of tarsands with hydraulic transport.

FIG. 1 illustrates schematically the process of the present invention for low temperature bitumen separation from tarsands mined by dry mining, hydraulic dredge mining or by waterjet surface or borehole mining. In dredge mining of the tarsands, a pond can be formed by water flooding a pit in the tarsands and the tarsands mined by a rotary cutter or bucket wheel supported by a dredge floating on the pond. The tarsands are sheared by the mining device and effectively slurried with water in a slurry pump under attrition scrubbing conditions to particulate the tarsands and to liberate the bitumen. In the use of high pressure waterjets in open pits and in boreholes formed in situ in the tarsands, jets of water or water containing a conditioning agent disintegrates the tarsands for slurrying of the tarsands and the slurry is collected and pumped through a pipeline by means of a slurry pump to produce desired attrition scrubbing conditions. It is also contemplated that the tarsands can be dry mined by conventional mining equipment and slurried with water such as in a slurry pump for transport through a pipeline with attendant attrition scrubbing.

The resulting slurry can contain up to 70% by weight tarsands, higher densities of tarsands in water being preferred for effective attrition scrubbing of the tarsands during passage of the tarsands through slurry pumps and pipelines for disintegration of the tarsands and release of the bitumen.

The temperature of the slurry during the operation of the process of the invention is preferably as low as possible and close to the tarsands temperature as permitted by ease of separation and optimum bitumen recovery to minimize energy costs. We have found that the operation of the process at a temperature in the range of from above freezing to about 35° C., preferably in the range of 2°–15° C., permits particulation and release of the bitumen from the sands and fine solids of the tarsands. The amount of mechanical shear energy, such as produced by attrition scrubbing during the mining operation and during slurrying and pipelining of the tarsands in water, particularly in the temperature range of 2–15° C., must be increased at the low end of the said temperature range and can be reduced at the upper end of the said temperature range, as will become evident as the description proceeds.

A conditioning agent for selective flotation of bitumen from the sand in the tarsands can be added to the tarsands slurry in the water supply to slurry pumps, to the water in the high pressure water jets during open pit or borehole mining, to the slurry during subsequent mixing of the tarsands during transportation by pipeline to a separation plant, or can be added to the slurry immediately prior to the froth flotation process.

The conditioning agent can be added to the slurry after introduction of the tarsands slurry feed to the embodiment of the process illustrated in FIG. 1, as depicted, or can be added with the tarsands slurry feed. The tarsands slurry feed can be subjected to mixing 10, as necessary, for a time sufficient to release bitumen from the tarsands and to uniformly disperse the conditioning agent on the bitumen prior to flotation 12. Bitumen froth overflows as product while the flotation underflow is subjected to classifying 14 for removal of free sands. Tarsands lumps and the like unbroken tarsands are subjected to attrition scrubbing, such as by tumbler attrition scrubbing 16, to disintegrate the lumps, and the liberated bitumen plus sands are added to the sands from classifying step 14 for gravity separating 18. Bitumen from gravity separating 18 is added to the bitumen product from flotation 12 for subsequent upgrading.

The process of the invention and operative parameters will now be described with reference to the following non-limitative examples. Testing was conducted on a representative average grade of tarsands obtained from a sample bank maintained by the Alberta Research Council in Alberta, Canada. The sample was split into 4 to 5 kg samples and refrigerated. The average sample assayed 10.5% bitumen, 83.5% solids (9.0% fines, 74.5% coarse sand), and 6.0% water.

Example 1

Figure 2:
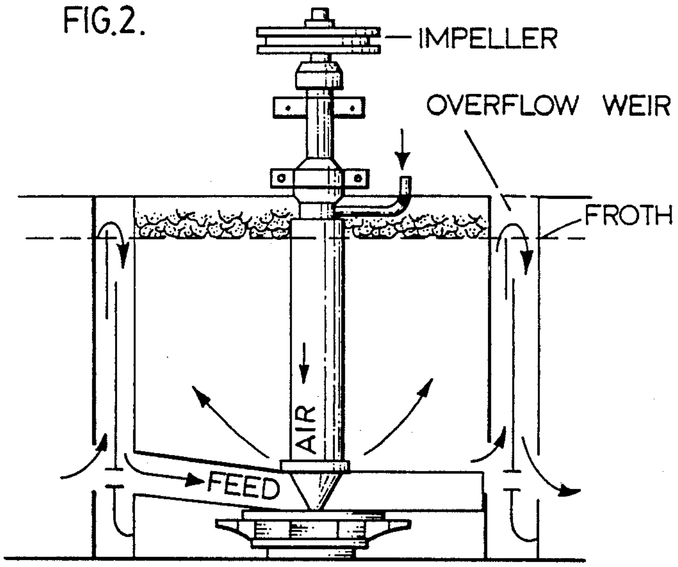
FIG. 2 is an illustration of a standard laboratory flotation cell used in the process of the invention.

A first set of tests was carried out in a standard laboratory Denver TM flotation cell of 4.5 litre (l) capacity shown in FIG. 2. The impeller and the rotor arrangement of the flotation cell effectively broke up the large size tarsands feed as well as homogenized the slurry. The tarsands feed lumps, along with 88% by weight water, were charged into the cell and agitated at various mixing speeds of 1500, 1800, 2400 and 3200 rpm. The tarsands lumps broke up readily in the water releasing bitumen particles, the degree of fragmentation depending on the mixing speed, i.e. total energy input. At the completion of the mixing process, five phases were observed in the slurry: bitumen free clean sand, released bitumen particles of a wide variety of sizes and shapes, unbroken tarsands lumps, clay fines in suspension, and water. Below 10° C., about 10% of the tarsands feed remained as unbroken lumps in the slurry at the 1500 rpm mixing speed and this proportion was reduced to a few pieces in number on increasing the mixing speed to 1800 and 2400 rpm. Raising the slurry temperature to above 20° C. equally reduced the proportion of unbroken tarsands lumps even at the 1500 rpm mixing speed. It is believed that the reduction in bitumen viscosity at 20° C. versus 5° C. slurry temperature contributed to the complete break-up of the tarsands fabric at the 20° C. temperature.

Example 2

Tarsands samples prepared as described above were tested in the same flotation cell to evaluate the physical and chemical nature of the attachment of air bubbles to bitumen particles at various slurry temperatures without a chemical conditioning agent addition and to determine the quality and quantity of the froth product so obtained. The results are summarized in Table 1, below.

TABLE 1

| Test Details | Bitumen Recovery In Froth Product (% by weight) |
|---|---|
| 11° C. & 1500 rpm | 2.2 |
| 16° C. & 1500 rpm | 8.1 |
| 20° C. & 1500 rpm | 8.0 |
| 25° C. & 1500 rpm | 36.0 |
| 35° C. & 1500 rpm | 84.8 |
| 35° C. & 1800 rpm | 85.7 |
| 47° C. & 1800 rpm | 86.5 |
| 65° C. & 1800 rpm | 87.2 |
| 80° C. & 1800 rpm | 89.6 |
| 25° C. & 2400 rpm | 41.3 |
| 35° C. & 2400 rpm | 84.3 |

Figure 4:
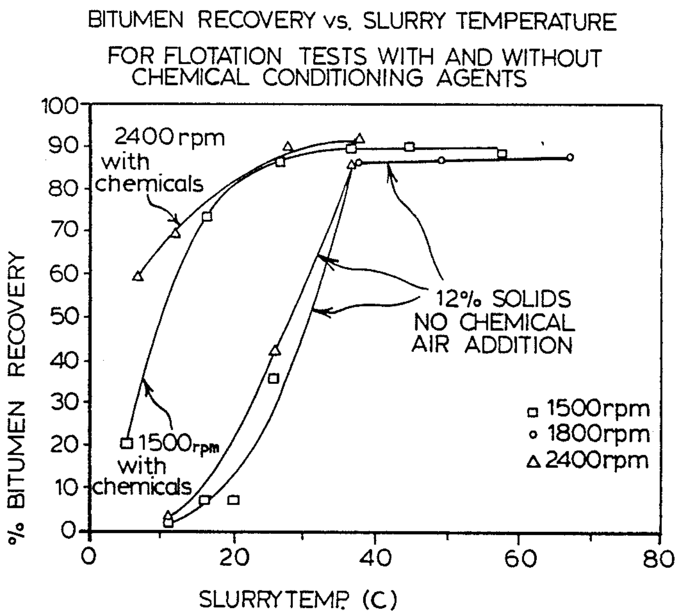
FIG. 4 is a graph illustrating bitumen recovery versus slurry temperature for flotation tests conducted with and without conditioning agents.

The bitumen recovery data indicated that despite bitumen being in a released state, there was no bitumen floating for slurry temperatures less than 10° C. This is believed due to the absence of chemical attachment between air bubbles and the bitumen particles at the low temperatures. As the slurry temperature increased, there was a gradual increase in the bitumen recovery obtained in the flotation product up to about a 25° C. slurry temperature and a rapid increase to about 35° C. The bitumen recovery obtained in the flotation product at 35° C. was about 85%, and this recovery increased marginally at higher temperatures. The bitumen recovery versus slurry temperature relationship obtained in these tests for 12% solids without conditioning agent addition is shown in FIG. 4.

Example 3

In these tests, conditioning agents in an amount up to 800 ppm were added to the tarsands slurry following the tarsands feed slurry preparation of three minutes, conditioning for two minutes by mixing, and floating with air addition at 2400 rpm mixing speed. The flotation temperature were 5° C., 15° C., 25° C. and 35° C. The chemical conditioning agents used in these flotation tests were kerosene and MIBC. It is believed the addition of kerosene increased the hydrophobicity of the released bitumen particles while MIBC provided stable air bubbles to make contact with the bitumen particles. Significant increases in bitumen recovery, even at low slurry temperatures, were observed. For example, the bitumen recoveries at 25° C. with and without chemical conditioning agent addition were 85% and 35%, respectively. It is believed that the added kerosene spread and formed a thin coating on the surface of the bitumen particles, promoting their attachment to air bubbles. This spreading factor could be further enhanced by applying high shear to promote good flotation characteristics. These effects are readily seen from the following bitumen recovery data from conditioned tarsands slurry:

| | |
|---|---|
| 5° C., 1500 rpm | 16.8 wt % bitumen recovery |
| 5° C., 2400 rpm | 58.2 wt % bitumen recovery |

The higher bitumen recovery appears to be due to the cumulative effects of shear and chemicals below 15° C. The bitumen recovery versus slurry temperature relationship obtained in flotation tests in which the mixing speeds (shear) were varied are shown in FIG. 4. These results indicate that as the temperature increased, the effect of increased mixing speed on the bitumen recovery narrowed, but continued to maintain a marginal improvement in bitumen recovery. As the slurry temperature increased, the effect of the residual surfactant present in kerosene could have become more pronounced. Hence, above 15° C., it is believed the cumulative effect of all the three parameters, namely temperature, mixing speed and chemicals, contributed to the high bitumen recovery. At 35° C. slurry temperature, the bitumen recovery obtained was 91.3% and was about six percentage points higher than that obtained without chemical addition. Further increases in slurry temperature above 35° C. did not materially increase the bitumen recovery beyond 91.0%. The bitumen in the tails were observed to be in the form of released particles and were physically trapped between the coarse sands.

Example 4

Tests were conducted varying the feed slurry mixing speed in the flotation cell from 1500 rpm to 2400 rpm and studying the bitumen flotation characteristics at various temperatures. From the bitumen recovery data shown below in Table 2, it is observed that for the slurry temperatures above 25° C., there was only a marginal increase if any in the bitumen recovery between 1500 and 2400 rpm mixing speeds.

TABLE 2

| Test Conditions | Bitumen Recovery (% by weight) |
|---|---|
| 1500 rpm, 25° C. | 36.0 |
| 2400 rpm, 25° C. | 41.3 |
| 1500 rpm, 35° C. | 84.8 |
| 1800 rpm, 35° C. | 85.7 |
| 2400 rpm, 35° C. | 84.3 |

Example 5

Figure 5:
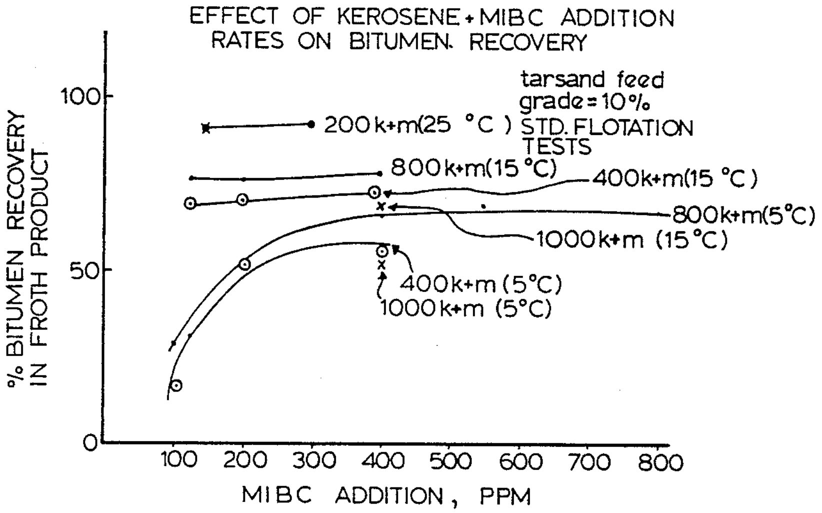
FIG. 5 is a graph illustrating the effect of kerosene and MIBC addition rates on bitumen recovery.

Flotation tests were conducted using an average bitumen grade of 10% in the tarsand feed to determine optimum chemicals addition for maximum bitumen recovery in the froth flotation product. Table 3 tabulates the quantity of chemicals added as kerosene (K) and MIBC (M) for various flotation temperatures showing percentage bitumen recovery, and FIG. 5 illustrates the results graphically for a 2400 rpm mixing rate.

It will be observed that increasing the kerosene addition for a given MIBC dosage rate increased the bitumen recovery at all temperatures. The optimum kerosene and MIBC additions for maximum bitumen recovery were 800 ppm and 400 ppm respectively at 5° C., both rates decreasing to 200 ppm each at 25° C.

Although the foregoing tests were conducted for a tarsands feed containing 10% bitumen, these addition rates are applicable to other grades of tarsand feed in the range of 3 to 13% bitumen, as will be described in Example 9.

respectively. It was observed that the addition of diesel in place of kerosene at a similar dosage rate resulted in a better quality froth product for diesel (70% bitumen content) than for kerosene (65% bitumen content) while maintaining a similar bitumen recovery. The flotation agent thus may be kerosene, diesel, a kerosene/diesel mixture or a like agent having similar hydrocarbon characteristics.

Gas-oil addition resulted in lower bitumen recovery compared to that obtained for kerosene addition at both temperatures. These tests used MIBC or Stanfroth 87™ as a frother. It was observed that only at 25° C. did the kerosene and Stanfroth 87™ combination yield a bitumen recovery (90.8%) as good as that obtained using the kerosene and MIBC combination. Since Stanfroth 87™ is substantially less expensive than MIBC, there is potential to reduce the cost of the chemicals when the separation takes place at 25° C. These tests supported the uniqueness of kerosene/diesel plus MIBC combination below 15° C. applications.

Example 7

The addition of flotation modifiers along with kerosene and MIBC were evaluated in flotation tests at low temperatures in the range of 5–15° C.

Figure 6:
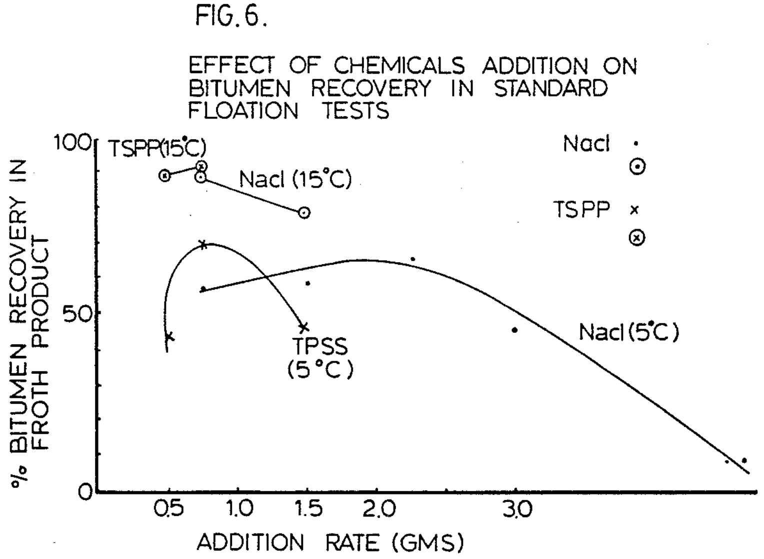
FIG. 6 is a graph illustrating the effect of flotation modifiers such as NaCl or TSPP in addition to kerosene and MIBC on bitumen recovery.

The tarsands slurry preparation (low shear mixing) and bitumen separation were carried out in a laboratory Denver™ flotation cell as per the standard procedure. In these tests tabulated in Table 4, the addition of sodium chloride (NaCl) at 1.5 kg/t of feed or sodium tri-poly phosphate (TSPP) at 1.0 kg/t of feed increased the bitumen recovery from 75% to about 90% at 15° C., while no improvement was observed at the 5° C. temperature. These test also revealed that there is an optimum concentration of Na-based chemical addition which is a function of temperature, as shown in FIG. 6. As noted from FIG. 6, over-dosage can drastically reduce bitumen recovery. It was also observed that Na-based chemicals (TSPP, NaCl, $NaHCO_3$, and $Na_2SO_4$) in general increase the bitumen recovery at 15° C.,

TABLE 3

| FEED GRADE (wt % Bitumen) | FLOTATION TEMP. (°C.) | CHEMICALS (K+M ppm) | BITUMEN RECOVERY (wt %) |
|---|---|---|---|
| 10% Bitumen Grade | 5° C. | 200 + 200 | 45.8 |
| | | 400 + 200 | 51.9 |
| | | 600 + 200 | 52.0 |
| | | 800 + 200 | 52.7 |
| | | 400 + 100 | 17.3 |
| | | 400 + 200 | 51.9 |
| | | 400 + 400 | 56.6 |
| | | 800 + 100 | 28.4 |
| | | 800 + 120 | 31.7 |
| | | 800 + 200 | 52.7 |
| | | 800 + 400 | 66.0 |
| | | 800 + 800 | 66.6 |
| | | 1000 + 400 | 52.0 |
| 10% Bitumen | 15° C. | 400 + 120 | 68.3 |
| | | 400 + 200 | 69.1 |
| | | 400 + 400 | 72.6 |
| | | 800 + 120 | 76.6 |
| | | 800 + 200 | 76.3 |
| | | 800 + 400 | 78.0 |
| | | 1000 + 400 | 65.6 |
| 10% Bitumen | 25° C. | 200 + 200 | 89.8 |
| | | 400 + 200 | 88.7 |
| | | 600 + 200 | 88.7 |
| | | 400 + 400 | 90.0 |
| 10% Bitumen | 35° C. | 200 + 120 | 92.4 |
| | | 400 + 120 | 92.3 |
| | | 600 + 120 | 91.9 |
| | | 400 + 400 | 89.6 |

Example 6

Flotation tests were carried out at 15° and 25° C. temperatures to evaluate potential substitutes for kerosene and MIBC. Hydrocarbons such as diesel and gas-oil and alcohol-based frothers such as Stanfroth 87™ were considered as substitutes for kerosene and MIBC while $CaCl_2$ appeared to have detrimental effect. Also, the addition of NaCl/TSPP lowered the MIBC requirement from 400 ppm to 300 ppm.

TABLE 4

| Chemical & Addition (GMS) | | Slurry Temp.(°C.) | wt % Bitumen Recovery in Froth Product | Froth Cmposition (wt %) Bitumen | Solids | Remarks |
|---|---|---|---|---|---|---|
| Nacl | 0.75 | 5 | 56.8 | 55 | 43 | |
| | 1.50 | 5 | 58.9 | 52 | 45 | |
| | 2.25 | 5 | 65.5 | 60 | 32 | |
| | 3.00 | 5 | 45.3 | 50 | 47 | |
| | 45.00 | 5 | 8.6 | 37 | 52 | |
| Nacl | 0.75 | 15 | 89.8 | 66 | 32 | |
| | 1.5 | 15 | 78.6 | 63 | 35 | |
| | 0.75 | 15 | 83.2 | 71 | 26 | 10 min. slurry conditioning instead of 5 min. |
| TSPP | 0.5 | 5 | 44.7 | 51 | 45 | |
| | 0.75 | 5 | 69.7 | 54 | 44 | |
| | 1.5 | 5 | 45.7 | 58 | 39 | |
| | 0.75 | 5 | 53.9 | 62 | 34 | 20 min. conditioning instead of 5 min. |
| TSPP | 0.50 | 15 | 89.3 | 66 | 32 | TSPP addition after |
| | 0.75 | 15 | 88.2 | 60 | 38 | 3 minutes of flotation |
| | 0.75 | 15 | 91.0 | 67 | 31 | |

Example 8

In this test, the pulp density of the tarsands slurry was increased to 40% by weight solids from the 15% normally used in the flotation tests described above and two stages of slurry preparation and bitumen flotation were adopted. This procedure resulted in bitumen recoveries of 90% and 95% at 5° and 15° C. respectively compared to 66% and 80% for a single stage separation for a 10% by weight bitumen grade tarsands. It is believed that the second stage slurry preparation enabled the release of bitumen particles that were part of the partially broken-up tarsands feed. Without this step, the partially broken-up tarsands feed ends up as flotation tails.

Example 9

Tarsands feed lumps of about 50 mm diameter having bitumen contents of from 3 to 13% by weight were mixed in a laboratory Denver flotation cell with water and broken down to grain size, releasing bitumen particles at all tested slurry temperatures of 5°-35° C. For a given mixing speed of 2400 rpm, increases in slurry temperature increased the proportion of released bitumen particles (as measured by bitumen recovery) present in the feed slurry, exhibiting a maximum release at about 20° C. Similarly for a given slurry temperature, increases in mixing (slurry preparation) time from 5 minutes to up to 20 minutes increased the proportion of released bitumen particles. High shear mixing, in place of flotation cell mixing reduced the mixing time by one-half to obtain a similar bitumen release.

Released bitumen particles, irrespective of the grade, showed similar tendencies to attach to air bubbles in the feed slurry and rise to the top as froth. For a low grade feed (3 to 7% by weight bitumen), fine solids also accompanied bitumen particles in the froth, resulting in a low quality froth.

Figure 7:
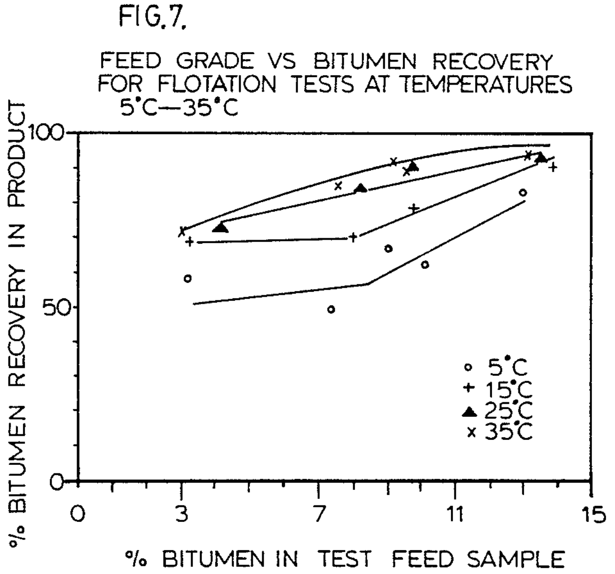
FIG. 7 is a graph illustrating tarsands feed grade versus bitumen recovery.
Figure 8:
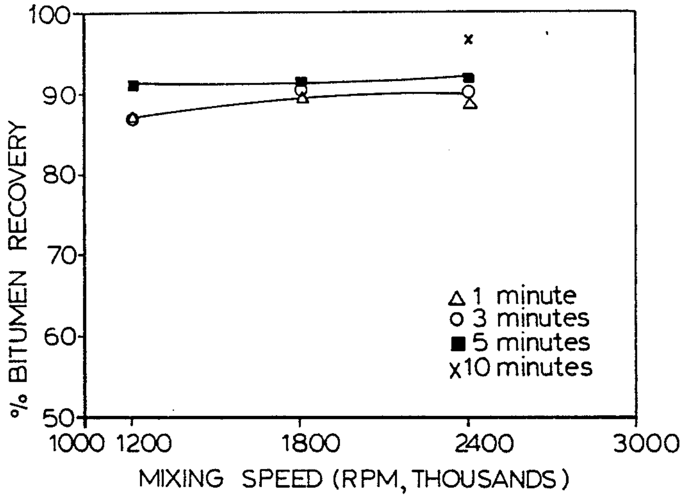
FIG. 8 is a graph illustrating the effect of attrition scrubbing mixing speed on bitumen recovery for a 70% solids feed slurry.
Figure 9:
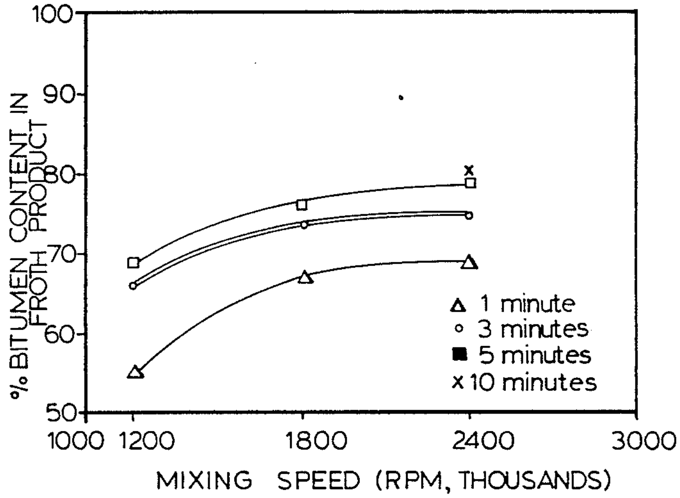
FIG. 9 is a graph illustrating the effect of attrition scrubbing mixing speed on percentage bitumen content in froth product for a 70% solids feed slurry.
Figure 10:
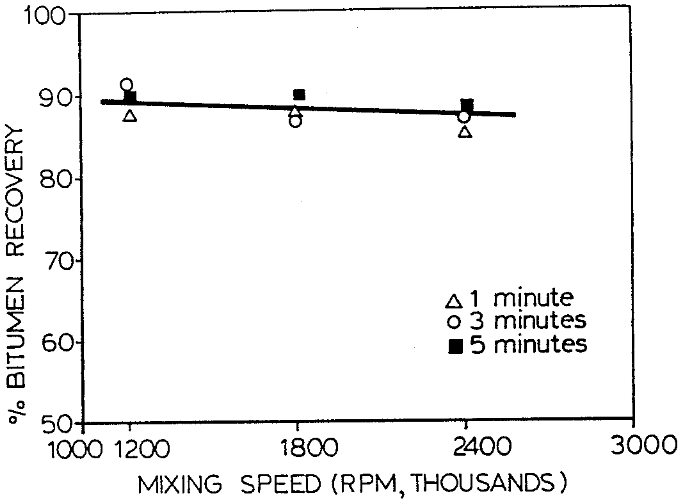
FIG. 10 is a graph illustrating the effect of attrition scrubbing mixing speed on bitumen recovery for a 50% solids feed slurry.
Figure 11:
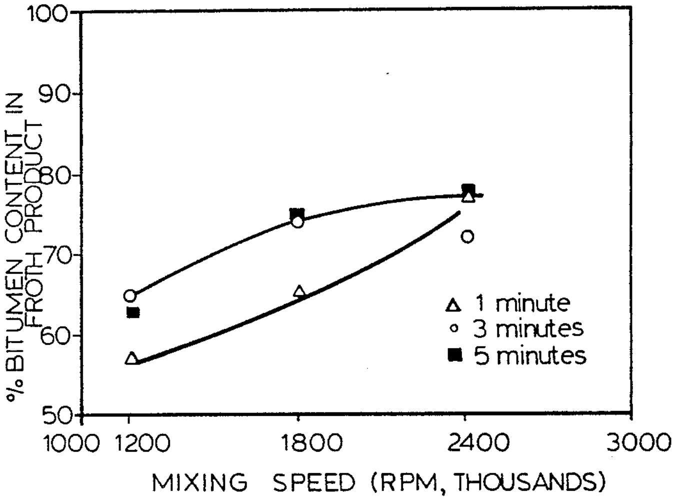
FIG. 11 is a graph illustrating the effect of attrition scrubbing mixing speed on percentage bitumen content in a froth product for a 50% solids feed slurry.

For a given tarsands feed slurry temperature, the bitumen recovery in the froth product increased with increase in bitumen content. For example at 5° C., the bitumen recoveries in the froth product were 55%, 65%, and 82% respectively for tarsands feed grades of 3, 10 and 13% by weight bitumen contents. Similarly, for a given tarsands feed grade, as shown in FIG. 7, the bitumen recovery increased with increases in slurry temperature. The bitumen recoveries were 65%, 75% and 90% respectively for a 9% by weight bitumen tarsands feed at 5° C., 15° C. and 25° C. At these temperatures, for a 13% by weight tarsands feed, the bitumen recoveries were 82%, 87% and 92%.

Example 10

The flotation tests discussed above indicate the importance of the feed slurry preparation step in bitumen separation to provide released bitumen particles for flotation. Slurry preparation was carried out using a standardized procedure; namely, 12% feed solids content slurry, i.e. 12% by weight tarsands feed and 88% by weight water, mixing speeds of 1500 to 2400 rpm and two minutes mixing time in a flotation cell. The flotation cell is not a suitable equipment for testing a wide range of slurry preparation conditions because of the limitations associated with this type of equipment. For example, a 50% feed solids content slurry could not be handled in the laboratory Denver flotation cell because the occurrence of hindered settling conditions prevented uniform mixing of the slurry. To fully understand the impact of the tarsands feed slurry preparation on bitumen separation, a different procedure known as attrition-scrubbing or high-shear mixing was undertaken.

Figure 3:
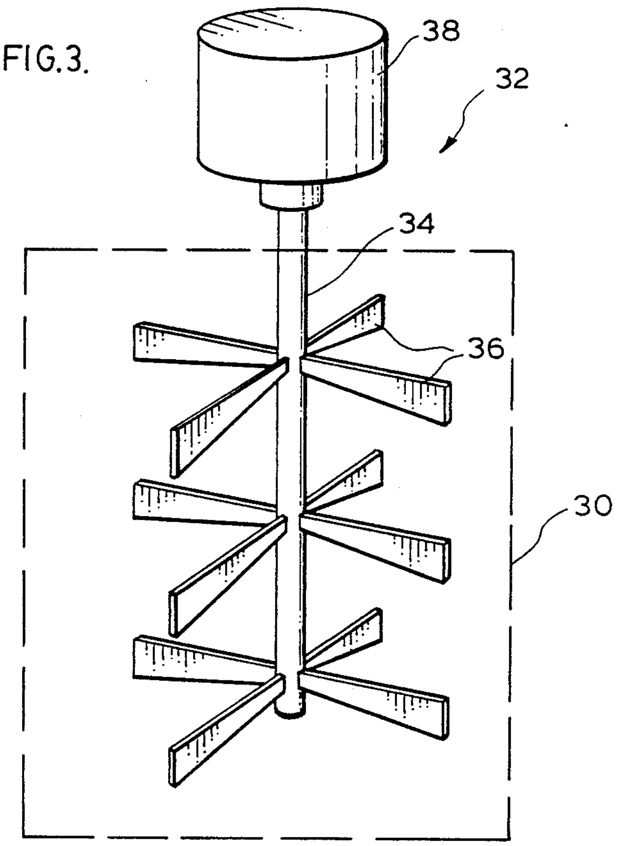
FIG. 3 is an illustration of an attrition scrubber used in the process of the invention.

A laboratory attrition-scrubbing cell 30, as depicted in FIG. 3, in which the mixing mechanism is significantly different from that in a flotation cell, was used in this test. The attrition-scrubber 32 has a central shaft 34 with several propellers 36 driven by remotor 38 and provides greater contact between particles and propeller surface than a flotation cell. The two types of attrition taking place in this type of cell are: attrition between the particles and attrition between the propeller blades and the particles. It is believed that such an enhanced attrition process releases bitumen particles more efficiently than a flotation cell mixing process.

The typical test procedure consisted of operating the attrition-scrubber at a pre-determined set of conditions for percent solids in feed slurry, mixing speed and mixing time, as shown in Table 5, transferring the slurry to a flotation cell, and carrying out bitumen separation as per the standard flotation procedure set out in the earlier tests.

TABLE 5

| Test Series | Mixing Speed (rpm) | Feed Solids Content (%) | Mixing Time (min.) | Flotation Conditions (standard) |
|---|---|---|---|---|
| 1 | 1200 | 70, 50 & 25 | 1, 3 & 5 | kerosene & MIBC additive |
| 2 | 1800 | 70, 50 & 25 | 1, 3 & 5 | 800 ppm, air addition |
| 3 | 2400 | 70, 50 & 25 | 1, 3, 5 & 10 | 1 1/min.), flotation |
| 4 | 3200 | 70 | 1, 3 & 5 | time (5 minutes), and |
| | | | | slurry temp. of 25° C. |

About 30 tests were conducted and the results are indicated graphically in FIGS. 8-11.

The results indicate that for a given mixing speed, increasing the mixing time increased the bitumen recovery by up to 8 percentage points and decreased the solids content of the froth product significantly, e.g. from 30.0% to 15.5% solids. A similar observation was noticed for the tests in which the mixing speed was varied, while maintaining the mixing time at a pre-determined value.

The attrition-scrubbing conditions of a high solids content of about 70%, high mixing speed (+1800 rpm) and a mixing time of about five minutes resulted in high bitumen recovery (90% plus) and an excellent quality froth product. The highest bitumen recovery of 95.7% was recorded for the attrition-scrubbing test carried out at 70% solids, 2400 rpm mixing speed and 10 minutes mixing time. The froth product which contained about 78% bitumen, 16% solids and 6% water compared in quality with that attainable in the conventional hot water extraction process. Yet another aspect of these tests is that the high bitumen recovery was maintained even at low temperature (8° C.). At this temperature, the flotation tests without attrition-scrubbing yielded only about 76% bitumen recovery and a high solids content (+30%) froth product. However, slurrying the tarsands feed for five minutes prior to flotation resulted in about 89% bitumen recovery and a much lower solids content (14%) froth product.

The addition of kerosene in the attrition stage did not result in increased bitumen recovery compared to the tests where kerosene and MIBC were added for conditioning at the flotation stage.

Example 11

Tests were carried out varying the tarsands feed slurry preparation time either in the flotation cell or in the attrition scrubbing unit from 5 to 20 minutes, while maintaining 5 minutes of bitumen separation time for all the tests. Test results are shown in Table 6.

TABLE 6

| TEST | TEMPERATURE (°C.) | BITUMEN RECOVERY IN FLOTATION FROTH PRODUCT (% by weight) |
|---|---|---|
| Flotation Machine Slurry Preparation, 2400 RPM | | |
| 5 Min | 5 | 66.0 |
| 10 Min | 5 | 62.0 |
| 20 Min | 5 | 85.6 |
| Attrition Cell Slurry Preparation, 2400 RPM | | |
| 5 Min | 5 | 65.8 |
| 10 Min | 5 | 88.6 |
| 20 Min | 5 | 92.1 |
| Flotation Machine Slurry Preparation, 2400 RPM | | |
| 5 Min | 15 | 78.0 |
| 10 Min | 15 | 89.3 |
| 20 Min | 15 | 91.9 |
| Attrition Cell Preparation, 2400 RPM | | |
| 5 Min | 15 | 88.0 |
| 10 Min | 15 | 92.7 |
| 20 Min | 15 | 92.8 |

Increased slurry preparation time was equivalent to increased mechanical shear energy input enabling efficient bitumen release from the tarsands feed and high bitumen recovery in the froth product. At 5° C., increasing the mixing time in the flotation cell during the slurry preparation from 5 to 20 minutes increased the product bitumen recovery from 66% to 85.6%. Tests were also conducted at this temperature using a high shear mixer (attrition-scrubbing at 2400 rpm) in place of the flotation cell for the tarsands feed slurry preparation step followed by transfer of the slurry to a flotation cell for bitumen separation. An increase of attrition-scrubbing mixing from 5 to 20 minutes increased bitumen recovery from 65.8% to 92.1%. It was observed that the bitumen recoveries were similar for the 10 minutes of high shear mixing and 20 minutes of low shear mixing (flotation cell mixing) tests.

At a 15° C. slurry temperature, increasing the mixing time in the flotation cell from 5 to 10 minutes increased the bitumen recovery from 78% to 89.3% and a further increase in mixing time to 20 minutes resulted only in a marginal gain of bitumen recovery of 89.3% to 91.9%. In the case of high shear mixing, the bitumen recoveries were 88%, 92.7% and 92.8% respectively for 5, 10 and 20 minutes of mixing. Based on bitumen recovery data, it was found that at 5° C., 10 minutes of high shear mixing was equivalent to 20 minutes of low shear mixing, while at 15° C., 5 minutes of high shear mixing was equivalent to 20 minutes of low shear mixing. The reduction in the equivalent high-shear mixing time from 10 minutes to 5 minutes was due to the increase in temperature from 5° C. to 15° C. The amount of mechanical shear input during tarsands slurry preparation and the slurry temperature thus can be exchanged for one another, as long as a minimum of each energy input is maintained.

Flotation tests were carried out using an Agitair TM cell and a Denver TM cell with a modified impeller/rotor system. Both the cells provided a good mixing/shear effect and the Agitar cell, in particular, also provided very fine sized air bubbles compared to other mechanical flotation cells. The mixing speeds in these cells were different from the standard flotation tests described earlier. Screening tests indicated that at a 15° C. slurry temperature, enhanced mixing/shear effect resulted in higher bitumen recovery (89% vs 75%) at 50% less MIBC addition compared to the standard flotation tests using low shear mixing. The reduction in MIBC addition was believed due to the availability of fine size air bubbles. The important aspect of the results of this batch of flotation tests using enhanced shear is that the bitumen recovery at about 90% is similar to that obtained in tests using NaCl/TSPP using low shear indictating that enhanced shear could replace a portion of the chemicals added for effective bitumen separation.

SUMMARY OF PREFERRED EMBODIMENTS

A flexible set of process conditions were developed by which control of the feed slurry mixed by attrition-scrubbing, the mixing speed, the mixing time, flotation agitation speed and the number of flotation stages resulted in a froth product assaying 70 to 80% bitumen content and a bitumen recovery greater than 90%. The set of conditions that resulted in a product assaying 78% bitumen content and recovering 91.0% of the bitumen in the feed is shown below:

| | |
|---|---|
| (1) Feed slurry solids content to attrition-scrubbing step | 75% |
| (2) Attrition mixing speed and time | 2400 rpm & 5 minutes |
| (3) Flotation agitation speed | 1800 rpm |
| (4) Flotation stage | single |
| (5) Flotation additives | kerosene & MIBC |
| (6) Feed slurry temperature | 25° C. |

The same set of test conditions with diesel instead of kerosene resulted in 92.6% bitumen recovery. In another example, increasing the attrition mixing speed to 3200 rpm while reducing the mixing time to three minutes resulted in a similar product. Increasing the mixing time to ten minutes at 2400 rpm while maintaining the other test conditions at the values shown above resulted in a higher bitumen recovery (95.6%). The flexibility to change these process conditions extend to the level of deleting the separate attrition mixing step and achieving both the slurry preparation and bitumen separation in a flotation cell. Such action resulted in the froth product containing 64.0% bitumen with a recovery of 89.2%. Refloating this bitumen product by MIBC reagent increases the bitumen content in the product to 70% plus. Another example of flexibility involves the elimination of chemicals addition to the flotation process and increasing the feed slurry temperature to about 35° C. In this case, the froth product contained 59.0% bitumen while the bitumen recovery was 85.7%. Such a bitumen product could be upgraded by two stages of flotation.

The bitumen in the flotation tails were found to be in the form of released particles physically trapped between the coarse sands. These released bitumen particles responded to gravity separation favourably. The separation was based on the density difference between the lighter bitumen particles ( 1.0) and the heavier sands (2.65). Based on a gravity separation treatment, the overall bitumen recovery from the flotation and gravity separation processes can exceed 96%. These developments have shown the feasibility of selecting different types of unit operations as well as process conditions to obtain high bitumen recovery at low temperatures. In addition to the low temperature incentive, the flotation tails appear to settle rapidly.

The typical bitumen froth product composition obtained with 5 minutes of low shear mixing and flotation at 15° C. in the presence of conditioning agent according to the process of the invention averages 60 to 70% bitumen and 20 to 30% solids. However, longer periods of low shear mixing of up to 20 minutes mixing as well as high shear mixing of shorter duration have consistently resulted in a better quality froth having a typical composition which averages 70 to 82% bitumen and 14 to 25% solids.

The high mechanical shear input has contributed to an efficient release of bitumen from the sands resulting in a low solids content froth product.

Figure 12:
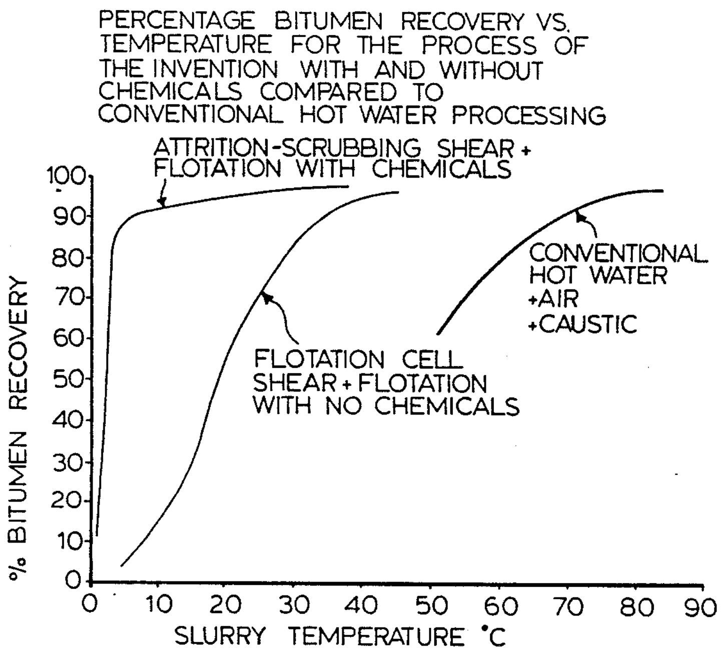
FIG. 12 is a graph illustrating percentage bitumen recovery versus temperature for the process of the present invention with optimum conditioning agent and without conditioning agents compared to a conventional hot water process.

With reference now to FIG. 12, the improvement in bitumen recovery attainable by the process of the invention using flotation cell mixing/high intensity attrition-scrubbing with conditioning agent for bitumen recovery of about 90% at 10° C. and 96% at 25° C. is illustrated graphically in comparison with bitumen recovery by the process without conditioning agent and in comparison with a conventional high energy hot water process in a caustic system. High yields of bitumen thus can be attained at low ambient temperatures by the froth flotation process of the invention integrated with hydraulic dredge or waterjet mining or borehole mining operations. The slurrying stage of hydraulic dredge mining and pumping of slurry through pipelines, and the jetting of tarsands by high pressure water or aqueous solutions containing conditioning chemicals in borehole mining provides a suitable preliminary mixing and may provide sufficient mixing of the tarsands in water to distintegrate and liberate the bitumen to render it suitable for froth flotation. The energy expended in mining the tarsands is thus beneficial for subsequent recovery processes.

Rapid disposal of tailing fines, as compared to conventional hot water caustic systems in which fines remain dispersed due to activation by NaOH and take several years to settle in large ponds, occurs by relatively quick settlement of the fines and can accomodate small tailing ponds due to the rapid liberation of the fines and due to the lack of fines activation as a result of high intensity mixing.

It will be understood that modifications can be made in the embodiment of the invention illustrated and described herein without departing from the scope and purview of the invention as defined by the appended claims.

I claim:

1. A process for separating and recovering bitumen from tarsands which comprise the steps of slurrying 15 to 70% by weight tarsands in water at a temperature in the range of from above about freezing to about 35° C. to form an aqueous slurry and mixing said slurry in the presence of a conditioning agent to selectively enhance flotation of the bitumen, said conditioning agent consisting of a floatation agent having the characteristics of a flotation agent selected from the group consisting of kerosene, diesel and kerosene/diesel and a frothing agent having the characteristics of methyl-isobutyl-carbinol added in an amount in the range of 100 to 800 ppm flotation agent and 50 to 400 ppm frothing agent, subjecting said slurry to which the conditioning agent has been added to mixing for a time sufficient to release bitumen from the tarsands and to uniformly disperse the conditioning agent on the bitumen, and subjecting the resulting conditioned slurry to froth flotation for recovery of a bitumen product and productions of sand tails.

2. A process as claimed in claim 1 in which said conditioning agent is added during slurrying of the tarsands in water.

3. A process as claimed in claim 1 in which said conditioning agent is added during slurrying of the tarsands in water by high pressure water jets containing the conditioning agent.

4. A process a claimed in claim 1 in which said conditioning agent is added after slurrying of the tarsands in water and during mixing of the slurry.

5. A process as claimed in claim 1 in which the tarsands are slurried in water at a temperature in the range of from 2° C. to 15° C.

6. A process as claimed in claim 5 in which the slurry is mixed by attrition scrubbing and has a tarsands content of about 70% by weight.

7. A process as claimed in claim 6 in which froth flotation is conducted in at least two stages.

8. A process as claimed in claim 5 in which froth flotation is conducted in at least two stages.

9. A process as claimed in claim 5 in which the tarsands are mined by hydraulic dredge mining, waterjet mining or borehole mining as an integrated preliminary step to the separating process.

10. A process as claimed in claim 1 including the step of adding sodium chloride to the slurry in an amount sufficient to maintain in the range of about 1.5 to 4 kilograms of sodium chloride per ton of tarsands.

11. A process as claimed in claim 10 in which the tarsands are slurried in water at ambient temperature from above freezing to 15° C., said flotation agent is added in a amount in the range of 400 to 800 ppm, and said frothing agent is added in an amount in the range of 200 to 400 ppm.

12. A process as claimed in claim 11 in which sodium chloride is maintained in the slurry in an amount in the range of 5 to 4 kilograms of sodium chloride per ton of tarsands feed, said slurry has up to 70% by weight tarsands and is mixed by attrition scrubbing for a least 10 minutes, and said slurry is adjusted by dilution with water to 15-30% by weight tarsands in the slurry prior to froth flotation.

13. A process is claimed in claim 11 in which froth flotation is conducted in at least two stages.

14. A process as claimed in claim 11 in which the tarsands are mined by hydraulic dredge mining, waterjet mining or borehole mining as an integrated preliminary step to the separating process.

15. A process as claimed in 1 including the step of adding sodium tri-poly phosphate to the slurry in an amount sufficient to maintain in the range of 1.0 to 2 kilograms per ton of tarsands.

16. A process as claimed in claim 15 in which the slurry is adjusted by water dilution to about 30% by weight tarsands in the slurry prior to froth flotation.

17. A process as claimed in claim 1 in which the slurry is mixed by attrition scrubbing or by a flotation impeller.

18. A process as claimed in claim 17 in which the slurry is adjusted by water dilution to about 30% by weight tarsands in the slurry prior to froth flotation.

19. A process as claimed in claim 1 in which the slurry is mixed by attrition scrubbing and has a tarsands content of about 70% by weight.

20. A process as claimed in claim 19 in which the tarsands are mined by hydraulic dredge mining, waterjet mining or borehole mining as an integrated preliminary step to the separating process.

21. A process for separating and recovering bitumen from tarsands which comprises dredge mining tarsands to form a slurry containing 15 to 70% by weight tarsands in water at a temperature in the range of from above freezing to about 35° C., mixing said slurry with a conditioning agent, to selectively enhance flotation of the bitumen, for a time sufficient to release bitumen from the tarsands and to uniformly disperse the conditioning agent on the bitumen, said conditioning agent consisting of a flotation agent having the characteristics of a flotation agent selected from the group consisting of kerosene, diesel and kerosene/diesel and frothing agent having the characteristics of methyl-isobutyl-carbinol added in an amount in the range of 100 to 800 ppm flotation agent and 50 to 400 ppm frothing agent, and subjecting the resulting conditioned slurry to froth flotation for recovery of a bitumen product and production of sand tails.

22. A process as claimed in claim 22 in which sodium chloride is maintained in the slurry in an amount in the range of about 1.5 to 4.0 kilograms of sodium chloride per ton of tarsands.

23. A process for separating and recovering bitumen from tarsands which comprises jetting tarsands by high pressure water jets to form a slurry containing 15 to 70% by weight tarsands in water at a temperature in the range of from above freezing to about 35° C., mixing said slurry with a conditioning agent, to selectively enhance flotation of the bitumen, for a time sufficient to release bitumen from the tarsands and to uniformly disperse the conditioning agent on the bitumen, said conditioning agent consisting of a flotation agent having the characteristics of a flotation agent selected from the group consisting of kerosene, diesel and kerosene/-diesel and frothing agent having the characteristics of methyl-isobutyl-carbinol added in an amount in the range of 100 to 800 ppm flotation agent and 50 to 400 ppm frothing agent, and subjecting the resulting conditioned slurry to froth flotation for recovery of a bitumen product and production of sand tails.

24. A process as claimed in claim 23 in which the tarsands are jetted by high pressure water jets in a borehole formed in situ in the tarsands.

25. A process as claimed in claim 24 in which water in the high pressure water jets contain the conditioning agent and the slurry is mixed with the conditioning agent by pumping the slurry from the borehole.

26. A process as claimed in claim 24 in which sodium chloride is maintained in the slurry in an amount in the range of about 1.5 to 4.0 kilograms of sodium chloride per ton of tarsands.

27. A process as claimed in claim 23 in which the tarsands are jetted by high pressure water jets in an open pit formed in the tarsands.

28. A process as claimed in claim 27 in which the water in the high pressure jets contains the conditioning agent and the slurry is mixed with the conditioning agent by pumping the slurry from the open pit.

29. A process as claimed in claim 26 in which sodium chloride is maintained in the slurry in an amount in the range of about 1.5 to 4.0 kilograms of sodium chloride per ton of tarsands.

* * * * *